June 20, 1950 W. WATERMAN 2,512,189
PROTECTION OF HYDRAULIC SYSTEMS
Filed Jan. 24, 1944 3 Sheets-Sheet 1

Inventor
William Waterman
by Roland C. Lehun
Attorney.

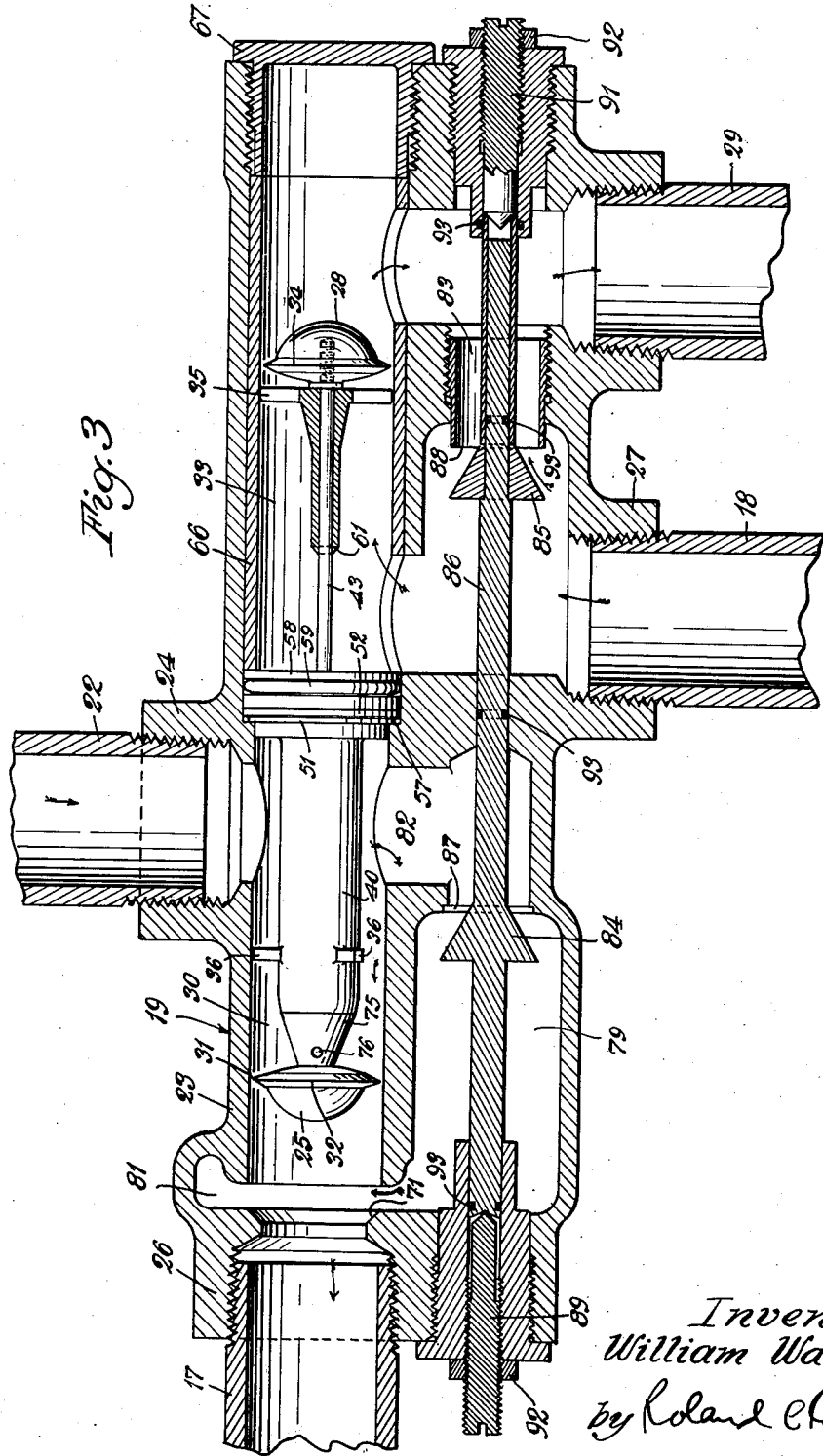

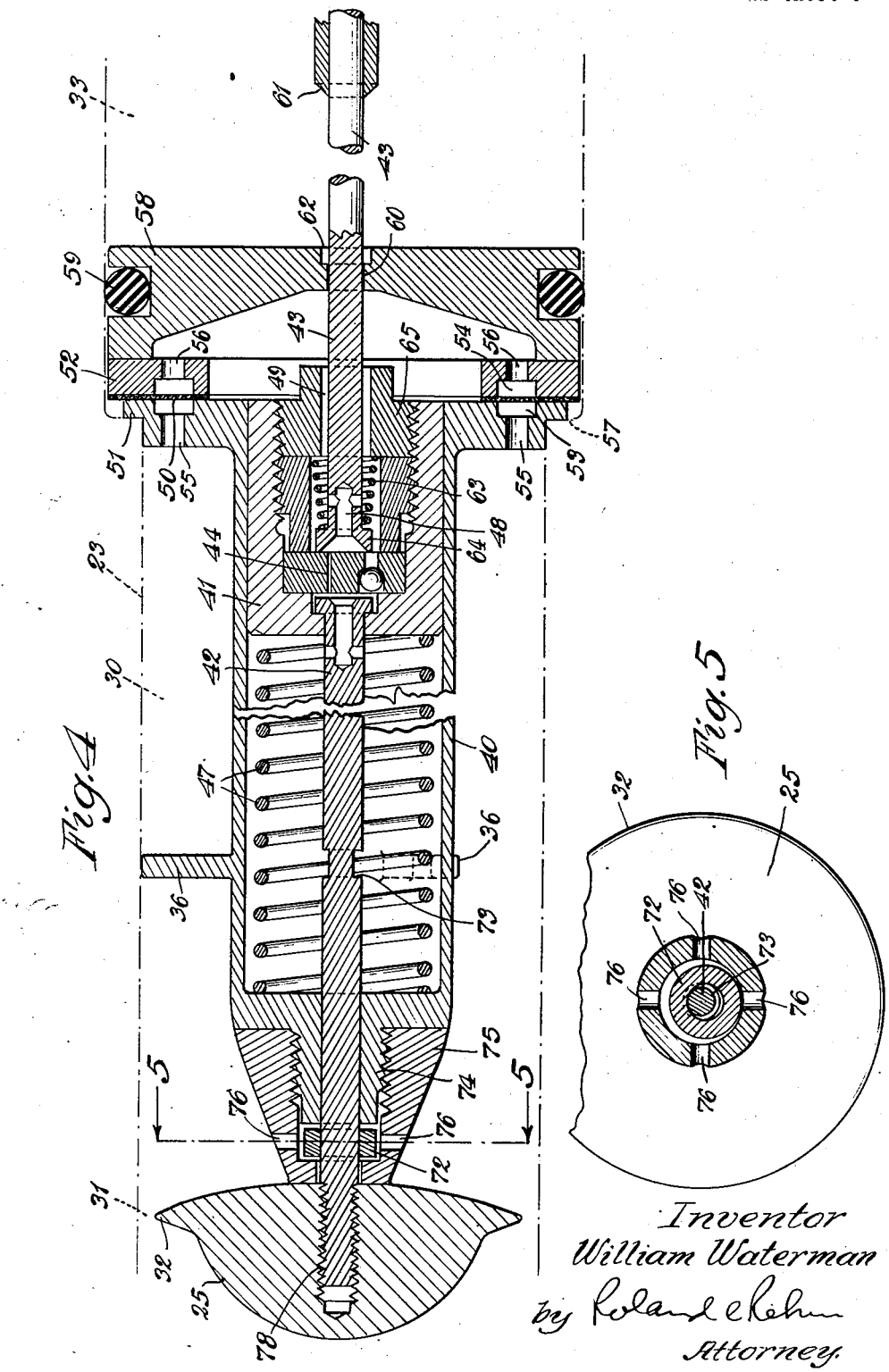

Patented June 20, 1950

2,512,189

UNITED STATES PATENT OFFICE 2,512,189

PROTECTION OF HYDRAULIC SYSTEMS

William Waterman, Chicago, Ill.

Application January 24, 1944, Serial No. 519,483

12 Claims. (Cl. 137—152)

This invention relates to the protection of hydraulic systems, such as the engine oil cooling system in aircraft, and among other objects aims to provide means which protect the system against complete loss of oil or hydraulic fluid in the case of rupture of the system, as by gunfire in the case of aircraft.

The invention may be readily understood by reference to one illustrative embodiment thereof shown in the accompaning drawings.

In said drawings:

Fig. 3 is a longitudinal sectional view of a protecting device used in the system;

Fig. 4 is a longitudinal sectional view on a larger scale of a portion of the protecting device shown in Fig. 3; and Fig. 5 is a cross-section taken on the plane 5—5 of Fig. 4.

Figure 1:
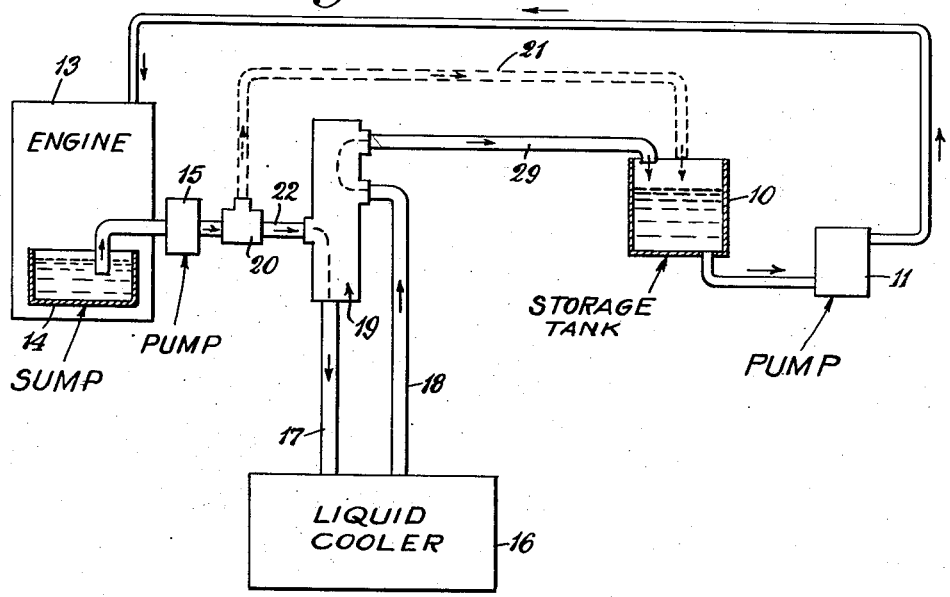
Figure 1 is a digram of an engine oil cooling system employed on aircraft.

One illustrative use of the invention is in the protection of the lubricating oil cooling system in aircraft (see Fig. 1). In such systems a separate pump (called a scavenger pump) is generally employed to withdraw the oil from the engine sump (e. g. crank case), pass it through an oil cooler (provided with air cooled surfaces for cooling the oil) and then into the oil storage tank. From the latter the oil is circulated by the oil pressure pump to the surfaces to be lubricated; it eventually reaches the aforesaid sump. Normally the oil is delivered to the engine at about 165° F. and leaves it at about 240° F. This excess heat is removed by the cooler.

The scavenger pump necesarily must have a slightly higher capacity than the oil pressure pump, otherwise the engine would fill up with oil. As a result of this excess capacity the scavenger pump is occasionally starved for oil and instead pumps air into the cooler. Also, when the aircraft flies in an inverted position, the scavenger pump pumps only air into the cooling system. The presence or possible presence of air in the cooling system creates problems, presently discussed, in the protection of the system.

In the event of puncture of the oil cooler, which is vulnerable since it is relatively exposed to currents of cooling air, the illustrative protecting device operates to short-circuit the cooler without cutting off oil supply to the engine. The loss of cooling will cause the oil to heat up and the engine to run at lower efficiency, but the engine can nevertheless operate for a substantial period of time before overheating to such an extent as to cause fire, freezing of bearings, etc. Normally the protective device is held against operation so long the oil returns from the cooling system to the storage tank, but interruption of such return flow conditions the device for operation. Since the device would respond when air instead of oil is returned, exactly as though there were no return flow, means is provided for preventing short-circuiting of the cooler until the air, which may in some cases equal the volume of the cooler, has passed, so as to insure against short-circuiting the cooler when the absence of returning oil is due not to rupture of the cooling system but simply to the presence of air in the cooler. It should be noted also that when the lubricating system is first filled with oil, the oil cooler is necessarily filled with air which must be displaced. The device must be so designed as to permit displacement of such air without short-circuiting the cooler.

Of course, in the event rupture of the cooling system was responsible for interruption of return oil flow, loss of an equivalent volume of oil would result before the cooler was short-circuited, but such loss would only be a small fraction of the total oil supply. In aircraft the volume of the oil cooler is small compared to the total oil supply.

In the illustrative oil cooling system for aircraft illustrated diagrammatically in Fig. 1, oil is withdrawn from the oil storage tank 10 by oil pressure pump 11 and delivered through one or more lines 12 to various parts of the engine 13. Eventually the oil collects in a sump 14 such as the crank case from which it is withdrawn by the scavenger pump 15 and delivered to the oil cooler 16 through line 17 and discharged from the oil cooler to the storage tank through line 18. The protecting device 19 is interposed in the cooler supply and return lines 17 and 18. In the event of short-circuiting the oil cooler 16, the oil pressure created by scavenger pump 15 opens a relief valve 20 which connects the pump discharge through line 21 with the storage tank. The relief valve is set to operate at pressures above the maximum normal operating pressures. The scavenger pump is ordinarily a low pressure pump whose normal operating pressure is generally from 25 to 30 pounds per square inch. Because of this relatively low operating pressure, it is important that operation of the protecting device 19 does not involve substantial pressure drop.

The illustrative protecting device is shown in

Fig. 3. As there shown the line 22 from the scavenger pump is connected with the housing 23 of the protective device at the inlet 24. In traveling through said housing, the oil passes a normally open valve 25 and enters the cooler supply line 17 which is connected to the housing at the outlet 26. The return line 18 from the cooler is connected with the housing 19 at the inlet 27 and after passing a counterbalancing device 28 leaves the housing by line 29 through which it reaches the storage tank.

Valve 25 is somewhat smaller in size than the oil passage 30 to provide an annular clearance 31 around the periphery 32 of the valve for the travel of the oil. The restriction in the passage thus resulting from the presence of the valve causes the oil to exert a force on the valve in the direction of oil travel tending to close the valve. This closing force is normally resisted by the counterbalancing device 28 which is designed in relation to the size of the oil passage 33 substantially to counterbalance the closing force of the oil on valve 25, and thereby to maintain the same open so long as oil returns to the storage tank through line 18 at the same rate as that at which it is supplied. For convenience a rate of return flow corresponding substantially to the rate of supply will be referred to as normal return flow. The periphery 32 of the valve and also the periphery 34 of the counterbalancing device may advantageously be made relatively thin or sharp to minimize variation in force on the valve by the flowing oil due to variations in viscosity of the oil.

In the event of interruption of oil flow through line 18 and thence through line 29, the counterbalancing force of the oil on the device 28 disappears, thereby conditioning the valve 25 for closing by the force of the flowing oil. The counterbalancing device 28 is provided with a guide or spider 35 having three or more projecting fingers engaging the sides of the passage 33 to center the counterbalancing device 28 in the passage. Valve 25 is centered in its passage by radial guide projections 36.

To prevent closing the valve due to air in the system as aforesaid, actual closing of the valve is prevented for a short period equivalent to the time required for travel of the air through the system, after counterbalancing pressure on the device ceases. The means for thus delaying the closing of the valve are here represented in the form of a dashpot cylinder 40 anchored in the housing 23 and a dashpot piston 41 interposed between but connected to the valve stem 42 and the stem 43 connecting the device 28 with the valve 25. Before valve 25 can close the dashpot piston 41 must discharge the oil in dashpot cylinder through the escape port of the dashpot cylinder. The delay thus caused in closing of the valve depends upon the volume of the oil which must be discharged from the dashpot, the resistance to discharge offered by the escape orifice 44, and the force of the flowing oil on the valve 25. The latter depends in turn upon the size of the annular clearance 31 between the valve and the wall of passage 30. A spring 47 of fair strength located within the dashpot cylinder and bearing against the dashpot piston assists in quickly opening the valve and refilling the dashpot cylinder when return flow restores the counterbalancing force to the device 28. The spring is not sufficiently powerful, however, to open the valve against pump pressure unless it be aided by fluid force on device 28.

In the present design, after the oil passes through escape orifice 44 it travels through the passage 48 in the stem 43 and through the clearance passage 49 around the stem. The oil actually entering the dashpot is filtered through a fine filter screen 50 between the flange 51 on the dashpot cylinder and an annular ring 52. The flange and the ring are provided with annular passages 53 and 54 opposite the screen and communicating with the exterior through a plurality of holes 55 and 56. Flange 51 is sealed against a shoulder 57 of the housing 19. A ring 58 carrying a sealing gasket 59 of synthetic rubber or the like serves to seal the passage 30 from the passage 33 wherein returning oil is at lower pressure.

Some slight leakage may occur through the hole 60 provided for the stem 43, but in normal operation such leakage is slight because the pressure differential between the passage 30 and 33 is relatively low. However, when valve 25 closes this pressure differential is substantial, being substantially equivalent to the pressure delivered by the pump. To prevent leakage at such times the device 28 is provided with a valve 61 which seats against the valve seat 62. To avoid the necessity for manufacture to impossibly close dimensions, a lost motion connection is provided between stem 43 and stem 42 to insure seating of both valves 61 and 25. In this case valve 61 seats first, then valve 25 continues to advance the short distance necessary to seat it. The lost motion connection is here shown in the form of a spring 63 located between a shoulder 64 on the stem 43 and bearing against a plug 65 threaded into the dashpot piston 41. The spring permits valve stem 41 to continue to move towards closing after seating of valve 61 arrests further movement of valve stem 43. The relative movement thus provided need only be slight. The strength of spring 63 should be such as to resist opening of valve 61 by fluid pressure opposite the valve. The aforesaid spring 63 coupled with the clearance 49 around stem 43 allows some slight lateral movement and prevents binding of the stem in the opening 60 which might otherwise be caused by slight axial misalignment between the passages 30 and 33.

A liner 66 bearing against the ring 58 and held in such position by the screw plug 67 completes the anchorage of the dashpot cylinder and its associated parts in place inside the housing 19.

To render the protecting means relatively insensitive to the action of very cold oil which may exist when the engine is first started, edge 32 of the valve is made relatively thin. Tests have shown that where the clearance 31 is very short in the direction of flow of the oil, the effect of varying viscosities on the valve is relatively negligible. Further to increase these characteristics of the protective device, the dashpot escape orifice 44 is made relatively long, thereby greatly increasing the effect (i. e. resistance to discharge from the dashpot) of an increase in viscosity of the oil. The combined effect of the elongated escape orifice 44 and the very short clearance annulus 31 minimizes the closing force of cold oil. Thus while the engine oil is being warmed up to efficient operating temperatures the tendency for the valve 25 to close under the drag of cold oil is minimized. This is not important because the aircraft does not leave the ground and engage in combat until the oil is warm, and until this occurs there is relatively little need for protection.

The device may advantageously be provided with a locking device which locks the valve 25 on its seat 71 so that the valve will not open if subsequently to its closing the airplane momentarily becomes inverted or if for any other reason the scavenger pump 15 pumps air instead of oil. In such a case the oil pressure holding the valve closed would be relaxed and the valve might open either by gravity or by the action of spring 47 or both. It is true that the valve would immediately close upon resumption of oil pressure, but this would involve further loss of oil, which in some instances might be objectionable, though in many cases the oil supply is adequate to permit some additional oil loss.

The locking device here shown is in the form of a ring 72 surrounding valve stem 41 and adapted to drop into a notch 73 on the valve stem which registers with the ring when the valve is closed (see Fig. 5). The ring is located in a recess between the threaded tip 74 of the dashpot cylinder and a streamlined cap 75 screwed thereon. A plurality of holes 76 are formed in the cap opposite the ring to permit the insertion of a tool to force the ring out of the notch and allow the valve to open.

Since the cooler capacity of various oil cooling systems varies depending upon the engine, it is desirable to adapt the design for easy application to various systems by allowing operation at varying rates of flow or volumes of oil to pass the valve 25 before it closes. This may be accomplished by varying the width of the annular clearance 31 either by employing valves 25 and 28 of different diameter or by using liners in passages 30 and 33 of different thickness. The valves are screwed onto the threaded tip 78 of the valve stem and may easily be replaced.

In Fig. 3 a still different means is shown for adapting the device to systems having varying rates of flow or cooler capacity. In this case only a fraction of the total oil flow passes valve 25. The balance is by-passed around the valve so long as it remains open. The by-pass passage 79 is here shown running parallel to and offset from the passage 30 and enters the main passage 30 through an annular orifice 81 located behind the valve seat 71. The by-passed oil enters the passage 79 through the port 82. Return oil is similarly by-passed through passage 83 so that approximately the same amount of oil passes counterbalance device 28 as passes valve 25. The passage 83 opens into the return line beyond counterbalance device 28. Adjustable throttling devices 84 and 85 are provided for varying the amount of oil by-passed thereby providing an adjustment for adapting the device to varying rates of flow or oil cooler capacities. The throttling devices are there shown mounted on a longitudinally movable rod 86 whose position relative to the ports 87 and 88 into the by-passing passages may be adjusted by appropriate means here represented by said screws 89 and 91. Each are provided with lock nuts 92 to secure them in their adjusted position. Preferably oil seals 93 are provided at various points along the rod 86 to prevent oil leakage.

Whatever means is employed for adapting the device to varying rates of flow and color capacities, the result is to maintain a uniform and limited pressure drop through the device. This minimizes the power required to operate the scavenger pump. In the present case there is only about a two pound drop at each end of the device.

Figure 2:
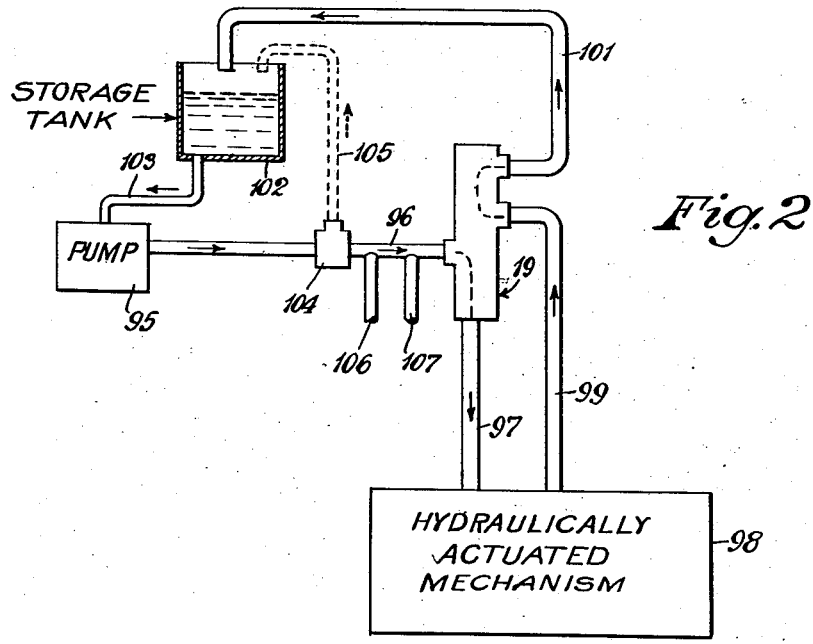
Fig. 2 is a similar diagram of an ordinary hydraulic system involving the inventive protecting means.

In Fig. 2 is diagrammatically illustrated a hydraulic system of general application embodying the above described protective device. As there shown the hydraulic pressure pump 95 supplies pressure fluid through lines 96 and 97 to the hydraulically actuated mechanism 98. Such mechanism may of course be greatly varied in character, and involve greatly varied rates of oil flow and volume of flow. The return lines 99 and 101 carry the return fluid to the storage tank 102, to which is connected the intake line 103. Interposed in the supply and return lines exactly as in Fig. 1 is a protective device 19 of the character illustrated in Fig. 3. Rupture of the oil passage at any point beyond the protective device will as in the case of the oil cooling system illustrated in Fig. 1 cause a short-circuit of the mechanism 98 without depriving other intact circuits of hydraulic fluid. Other lines, 106—107, etc., leading to other hydraulically actuated mechanisms are not affected. If necessary one or more other such hydraulically actuated mechanisms may be provided with a protective device 19 as illustrated in Fig. 2. In this case the relief valve 104 serves the normal function of a relief valve, namely of by-passing to the storage tank through line 105 if and when the pressure should become excessive.

Obviously the invention is not limited to the details of the illustrative device since these may be variously modified. Moreover, it is not indispensable that all features of the invention be used conjointly since various features of the invention may be employed to advantage in different combinations and sub-combinations.

Having described my invention, I claim:

1. In a hydraulic system including supply and return lines the combination comprising a valve in the supply line provided with means for biasing the valve to open position, said valve being movable by the force of hydraulic flow therein to close said valve and thereby to interrupt flow, means in the return line acted on by the force of hydraulic flow in said return line and operatively connected with said valve to hold the latter against closing so long as the force exerted thereon by return flow overbalances the closing force on said valve said means being designed to overbalance the closing force on said valve only during normal return flow but being incapable of holding said valve open if the flow in the return line be reduced below normal or comprise merely air, and a device for delaying the closing of said valve to permit a limited amount of air to pass into said return line without closing of said valve.

2. In a hydraulic system including supply and return lines, a protective device comprising in combination a valve in the supply line biased to open and movable by the force of flow therein to close said line, means in the return line operatively connected with said valve and acted on by the force of normal return flow to hold said valve open against the force tending to close it, said means being insufficient to hold said valve open upon reduction below normal of return flow relative to the flow in the supply line, and mechanism for delaying closing of said valve after such reduction of flow in the return line.

3. In a hydraulic system including supply and return lines, a protective device interposed in said lines and comprising in combination a valve in the supply line baised to open and movable by the force of normal flow past the valve to close said line, means operative in response to normal flow in the return line for holding said valve open against the force of the flow in said supply line and operative upon reduction of below normal flow in the return line relative to that in the supply line to allow said valve to close, and means for by-passing a fraction of the total flow around the valve when open, said by-passed flow being interrupted by closing of said valve.

4. In a hydraulic system including supply and return lines, a protective device comprising in combination a valve in said supply line arranged to be set in open position for controlling flow therethrough the supply line and movable by the flow therein to closed position, valve guiding means including a valve stem, means responsive to normal flow in the return line for holding said valve open, said means being overbalanced to permit closing of the valve when return flow falls below normal, and a locking ring surrounding said valve stem, the latter having a notch therein adapted to register with and receive said ring when said valve is in closed position to hold the valve closed.

5. A protective device for hydraulic systems comprising in combination a housing adapted to be connected to supply and return lines, supply and return passages in said housing carrying supply and return flow respectively, means including a valve in said supply passage arranged when open to be acted on by flow therein to close said valve, a counter balancing device in said return passage and acted upon by the force of flow therein and operatively connected with said means and adjusted to counter balance the force on said means to hold the valve open by flow therethrough which is normal relative to the flow in the supply passage, said counter balancing device being adjusted to allow closing of said valve upon reduction below normal of flow in said return passage relative to that in said supply passage.

6. A protective device for hydraulic systems comprising in combination a housing adapted to be connected to supply and return lines, supply and return passages in said housing for carrying supply and return flow respectively, means including a valve in said supply passage arranged when open to be acted on by flow therein and movable thereby in the direction of flow to close said passage, a counter balancing device in said return passage and acted upon by the force of flow therein and operatively connected with said means and adjusted so as to produce by a flow through said return passage which is normal relative to the flow in the supply passage, a force to counter balance the force on said means thereby to hold the valve open, said counter balancing device being adjusted to allow closing of said valve upon reduction of flow in said return passage below said normal flow, and means for momentarily delaying closing of said valve after reduction in said return flow.

7. In a hydraulic system including supply and return lines a combination comprising a housing having supply and return passages therein adapted to be connected respectively with the said lines for carrying supply and return flow respectively, valve and valve controlling means in said housing for closing said supply line and including devices in each of said supply and return passages exposed to and movable by the force of fluid flow in said supply and return passages, the device in said return line being operatively connected to that in said supply line and tending to hold said valve open, said device in said return line being adjusted to counter balance the device in the supply line when the return flow is equal to the supply flow to prevent closing operation of the valve, said device in the return line being movable upon reduction in return flow relative to that in the supply line to permit closing of the valve.

8. In a hydraulic system including supply and return lines a combination comprising a housing having supply and return passages therein adapted to be connected respectively with the said lines for carrying supply and return flow respectively, valve and valve controlling means in said housing for closing said supply line and including devices in each of said supply and return passages exposed to and movable by the force of liquid flow in said supply and return passages, the device in said return line being operatively connected to that in said supply line and tending to hold said valve open, said device in said return line being adjusted to counter balance the device in the supply line when the return flow is equal to the supply flow to prevent closing operation of the valve, said device in the return line being movable upon reduction in return flow relative to that in the supply line to permit closing of the valve, the flow of air past the latter device being incapable of exerting sufficient force to cause said counter balancing, and mechanism for retarding closing of said valve designed to permit passage of a predetermined volume of air in said return line.

9. In a fluid system including supply and return lines, the combination comprising a valve arranged to be set in open position in and adapted to close said supply line, flow responsive devices in and exposed to and movable by the force of flow in said supply and return lines respectively for controlling the operation of said valve, and means for interconnecting said devices, the force of flow in said supply line tending to close said valve and the force of flow in said return line tending to prevent closing of said valve, said devices being relatively constructed and arranged to enable the device in the return line to hold said valve against closing only when the flow in said return line is at least equal to that in said supply line, the force of return flow on the latter device being insufficient to prevent closing of said valve when said return flow is substantially less than flow in said supply line.

10. In a fluid system including supply and return lines, the combination comprising a valve arranged to be set in open position in and adapted to close said supply line, flow responsive devices in and movable by the force of flow in said supply and return lines respectively for controlling the operation of said valve, and means for interconnecting said devices and so designed as to balance the forces on the same when the flow in said supply and return lines is substantially equal, said devices being also relatively constructed and arranged to be unbalanced in valve closing direction sufficiently to effect closing of said valve by reduction of flow in said return line relative to that in said supply line.

11. In a hydraulic system including supply and return lines, a protective device comprising in combination a valve arranged to be set in open position in the supply line movable by the force of flow in said supply line to close the valve, means in the return line exposed to and operated on by flow in the return line and operatively connected to said valve for holding the latter open, said means being constructed and arranged to exert a force sufficient to hold said valve open against the closing force exerted by the flow in the supply line only during normal flow in said return line but exerting insufficient force upon reduction of return flow below normal.

12. A protective device for a hydraulic system comprising in combination a housing having main supply and return passages adapted to be connected in supply and return lines for said system, a valve seat in said main supply passage and a valve therein movable by the force of flow in said supply passage to close said main passage to interrupt flow, means in said return passage and acted upon by the force of normal return flow therein for holding said valve against closing and yielding to permit said valve to close when the return flow is less than normal, a by-pass channel for carrying a portion of the supply flow around said valve and connecting with said main supply passage in advance of said seat so that said by-pass channel is closed upon seating of said valve, a similar by-pass channel for carrying a portion on the return flow around said means, and a proportioning device for similarly adjusting the proportion of supply and return flow passing through the respective by-pass channels, whereby the ratio of supply and return flows to the respective by-passed flows remains constant.

WILLIAM WATERMAN.

REFERENCES CITED

The following references are of record in the file of this patent:

UNITED STATES PATENTS

| Number | Name | Date |
| --- | --- | --- |
| 704,315 | Gibbs | July 8, 1902 |
| 1,125,315 | Hayward | Jan. 19, 1915 |
| 1,431,511 | Claasen | Oct. 10, 1922 |
| 1,455,633 | Lundgaard | May 15, 1923 |
| 1,474,472 | Gulick | Nov. 20, 1923 |
| 2,226,545 | Blasig | Dec. 3, 1940 |
| 2,387,531 | Rose | Oct. 23, 1945 |

FOREIGN PATENTS

| Number | Country | Date |
| --- | --- | --- |
| 456,991 | France | Sept. 2, 1913 |
| 498,511 | Germany | June 2, 1930 |
| 669,897 | France | 1929 |